United States Patent [19]

Dettling et al.

[11] Patent Number: 4,732,637

[45] Date of Patent: Mar. 22, 1988

[54] METHOD OF FABRICATING AN INTEGRAL GAS SEAL FOR FUEL CELL GAS DISTRIBUTION ASSEMBLIES

[75] Inventors: Charles J. Dettling, E. Hanover; Peter L. Terry, Chathum, both of N.J.

[73] Assignee: Engelhard Corporation, Menlo Park, N.J.

[21] Appl. No.: 848,840

[22] Filed: Apr. 3, 1986

Related U.S. Application Data

[60] Continuation of Ser. No. 687,806, Dec. 31, 1984, abandoned, which is a division of Ser. No. 484,014, Apr. 11, 1983, Pat. No. 4,505,992.

[51] Int. Cl.$^4$ .............................................. B32B 31/20
[52] U.S. Cl. ................................... 156/295; 428/306.6; 428/319.7; 428/408; 429/36
[58] Field of Search ................... 156/295; 428/306.6, 428/319.7, 408; 429/36

[56] References Cited

U.S. PATENT DOCUMENTS 3,650,840  3/1972  Dietz ........................................ 429/36
4,374,906  2/1983  Breault et al. ...................... 429/36 X
4,382,113  5/1983  Schwartz et al. ................... 428/408

FOREIGN PATENT DOCUMENTS

1544940  11/1968  France .

Primary Examiner—Robert A. Dawson

[57] ABSTRACT

A porous gas distribution plate assembly for a fuel cell, such as a bipolar assembly, includes an inner impervious region wherein the bipolar assembly has good surface porosity but no through-plane porosity and wherein electrical conductivity through the impervious region is maintained. A hot-pressing process for forming the bipolar assembly includes placing a layer of thermoplastic sealant material between a pair of porous, electrically conductive plates, applying pressure to the assembly at elevated temperature, and allowing the assembly to cool before removing the pressure whereby the layer of sealant material is melted and diffused into the porous plates to form an impervious bond along a common interface between the plates holding the porous plates together. The distribution of sealant within the pores along the surface of the plates provides an effective barrier at their common interface against through-plane transmission of gas.

10 Claims, 7 Drawing Figures

METHOD OF FABRICATING AN INTEGRAL GAS SEAL FOR FUEL CELL GAS DISTRIBUTION ASSEMBLIES

This is a continuation of co-pending application Ser. No. 687,806, filed on Dec. 31, 1986, now abandoned, which is a division of application Ser. No. 484,014, filed Apr. 11, 1983, issued as U.S. Pat. No. 4,505,992.

BACKGROUND

The present invention relates to improved gas distribution assemblies for use in fuel cells, fuel cells employing such elements, and processes and apparatus for making such elements.

Reference is hereby made to other related patent applications which are assigned to the same assignee as the present application; application of H. Feigenbaum and A. Kaufman entitled "Integral Gas Seal For Fuel Cell Gas Distribution Plate", Ser. No. 430,453, Filed on 9/30/82; application of H. Feigenbaum and S. Pudick entitled "A Process For Forming Integral Edge Seals In Porous Gas Distribution Plates Utilizing A Vibratory Means", Ser. No. 430,291, Field on 9/30/82 and application of H. Feigenbaum, S. Pudick and R. Singh entitled "Edge Seal For Porous Gas Distribution Plate Of A Fuel Cell," Ser. No. 430,142, Filed on 9/30/82 and now U.S. Pat. No. 4,459,212.

Fuel cell design and operation generally involves conversion of a hydrogen-containing fuel and some oxidant via an exothermic reaction into D.C. electrical power. This reaction is well-known and has established parameters and limitations. It has been known for some time that fuel cells can be extremely advantageous as power supplies, particularly for certain applications such as a primary source of power in remote areas. It is highly desirable that any such cell assembly be extremely reliable. Various fuel cell systems have been devised in the past to accomplish these purposes. Illustrative of such prior art fuel cells are those shown and described in U.S. Pat. Nos. 3,709,736, 3,453,149 and 4,175,165. A detailed analysis of fuel cell technology comparing a number of different types of fuel cells appears in the "Energy Technology Handbook" by Douglas M. Consadine, published in 1977 by McGraw Hill Book Company at pages 4-59 to 4-73.

U.S. Pat. No. 3,709,736, assigned to the assignee of the present invention, describes a fuel cell system which includes a stacked configuration comprising alternating fuel cell laminates and electrically and thermally conductive impervious cell plates. The laminates include fuel and oxygen electrodes on either side of an electrolyte comprising an immobilized acid, U.S. Pat. No. 3,453,149, assigned to the assignee of this invention, is illustrative of such an immobilized acid electrolyte. The fuel cells further comprise gas distribution plates, one in electrical contact with the anode and one in electrical contact with the cathode. The gas distribution plates conduct the reactant materials (fuel and oxidant) to the fuel cell.

In order to electrically interconnect a group of discrete cells to form one larger fuel cell stack, bipolar assemblies are commonly used. For instance, in U.S. Pat. No. 4,175,165, assigned to the assignee of the present invention, a stacked array of fuel cells is described wherein reactant gas distribution plates include a plurality of gas flow channels or grooves for the distribution of the reactants. The grooves for the hydrogen gas distribution are arranged orthogonally relative to the grooves for the oxygen distribution.

The gas distribution plates themselves, whether they are part of termination assemblies having individual distribution plates for one or the other of the reactants or bipolar assemblies having two distribution plates for distributing both reactants in accordance with this disclosure, are formed of an electrically conductive impervious material. Where bipolar plates are prepared from a non-porous material, such as aluminum, the plate is typically coated with a layer of non-corrosive material, such as gold, so as to effectively isolate it from the corrosive agents, such as the electrolyte, within the fuel cell environment. In more recent fuel cell designs, the gas distribution plates of such assemblies are formed of a porous material so that a more uniform and complete flow of gas over the electrode surface is provided.

In previous systems wherein nonporous gas distribution plates were utilized, the reactants always flowed only through the grooves and were contained by the walls thereof. However, in the more recent systems utilizing porous plates, it has been necessary to seal the porous plates along the edges, and in bipolar assemblies, to segregate the reactants from one another to avoid their unintended mixing which could cause the cells to operate improperly or fail altogether.

Various techniques for sealing such porous gas distribution plates are known. In one such approach, an impervious plate is placed between the gas distribution plates forming a bipolar assembly to prevent the reactants from mixing together. In another prior art approach, a sealed bipolar plate is made up of a porous carbon plate layer which is first grooved to provide the reactant channels. Then, five or six layers of suitable material such as a resin or carbon material are placed on or impregnated into all surfaces. However, in this arrangement, the sealing layer is very thin and if damaged, exposes the original porosity of the porous carbon plate. Although this technique precludes unintended gas transmission, it can result in inadequate electrical contact between such contiguous layers and cells.

In the area of cooling assemblies typically used in larger stacks of fuel cells, a technique has been devised in which a sealant film and additional conductive materials are sandwiched between two plates to provide a bridging electrical contact across the interfacial boundary which separates them. This technique is disclosed in a copending, commonly assigned, U.S. Application entitled "Film Bonded Fuel Cell Interface Configuration" by A. Kaufman and P. Terry, Ser. No. 430,148, Filed on 9/30/82, and now abandoned. This arrangement provides effective containment of free electrolyte, a corrosive agent, from the cooling assembly as well as good electrical conductivity. However, it is readily apparent that this approach introduces additional components at the interface of such plates which can complicate manufacture and assembly.

A number of techniques have been disclosed in the prior art relating to the preparation of plates in fuel cells. These include U.S. Pat. Nos. 2,969,315; 3,223,556; 3,479,225; 3,779,811; 3,905,832; 4,035,551; 4,038,463; 4,064,322; and 4,311,771. For instance, the U.S. Pat. No. 2,969,315 discloses a fuel cell configuration in which a bipolar plate is fabricated by deposition of two layers of porous nickel on opposite sides of a common support. This common support effectively precludes gas transmission between the two porous nickel layers. Each of the two porous layers can be formed from a nickel powder by sintering the powder on the support layer.

The U.S. Pat. No. 3,223,556 discloses a fuel cell configuration in which a gas impermeable layer, moistened with electrolyte, is disposed intermediately between two layers of porous material containing the deposited catalyst on its respective surface opposite the gas impermeable layer. Electrical contact between these porous layers is achieved through an external circuit which connects an electrical grid within each catalyst to an incandescent lamp. The gas impermeable member which separates each of the porous plates from one another does not apparently bond the two porous plates to the other. The physical integrity of this composite is maintained by some other means.

The U.S. Pat. No. 3,479,225 discloses air and oxygen depolarized electrochemical units for electrochemical generation of electric current. This device is of a modular cell construction having a replaceable modular anode. The anode illustrated for this device is itself of a composite construction whereby two separate parallel plates of the anode module are bisected by an insulating layer. This insulating layer is gas transmissive but exclusive of fuel transfer therebetween. The U.S. Pat. No. 431,771 discloses a permselective bipolar membrane for electrodialyte cells, the permselective membranes comprising two layers of weakly dissociated ion exchange materials in intimate contact with one another.

The U.S. Pat. Nos. 3,779,811, 4,064,332, and 4,038,463 disclose a system for maintaining the proper fluid balance within a fuel cell by separation of the volume tolerance of the cell from its electrochemical balance. This is achieved by providing a porous back-up plate to each anode and cathode. This plate serves as a reservoir for storing excess fluid produced during the electrochemical reaction of oxygen and hydrogen and for replenishment of electrolyte which is lost as a result of high temperature operation. Each of the porous back-up plates is connected to either the anode or the cathode by means of a series of porous pins. The U.S. Pat. No. 4,064,332 patent discloses that the catalyst containing layer contiguous to the electrolyte reservoir is impregnated with a hydrophobic material "to a shallow depth". This hydrophobic material is impermeable to electrolyte yet permeable to gas, thereby permitting gas accessability to the catalyst.

In the construction of bipolar assemblies, as well as other assemblies used in fuel cells such as current collecting assemblies and cooling assemblies wherein distribution of the reactants takes place, it is apparent that the effective containment of reactant materials is important. In such assemblies it is also equally apparent that the assemblies should maintain electrical continuity and, in some cases, also provide a barrier against corrosive agents which are a necessary part of the stack from reaching those regions within the stack that would be adversely affected thereby. Accordingly, the invention disclosed herein provides an integral gas seal for gas distribution assemblies for use in fuel cells. It also provides process and apparatus for making such an assembly.

SUMMARY OF THE INVENTION

In accordance with this invention, a porous gas distribution assembly, such as a bipolar assembly is provided with an integral inner impervious region. The impervious region can be formed in two porous plates, preferably carbon, at the interface between the two plates by impregnating a sealant material therein. When impregnated into the porous plates, the sealant material acts as a bond to hold the plates together in a single integral bipolar assembly. Grooves may be placed in the carbon plates on the outer facing surfaces opposite the interface layer, the grooves of one plate being substantially perpendicular to the grooves of the other plate. The impervious region is such to prohibit reactant gases from mixing via through-plane transmission but permit electrical conductivity from plate to plate through the impervious region. A fuel cell, in accordance with the present invention, can employ a plurality of the porous bipolar gas distribution plate assemblies including the inner impervious regions.

According to one embodiment of the process of the present invention, two porous plates or lamina and a layer of sealant material positioned in between the plates, are provided. Pressure and elevated temperature are then applied to the plates and layer of sealant material to melt the layer. The material in the layer impregnates the porous plates as it melts to bond the plates together. Through the proper selection of film thickness, pressure and temperature, the thermoplastic sealant film flows into the pores along the surface of each of the contiguous plates thereby effectively bonding one plate to the other and sealing each such plate along this common interface against gas transfer. Further, before the pressure on the bipolar assembly is removed, cooling is allowed to occur to a lower temperature.

In one embodiment of this process, a thermoplastic film of sealant such as polyethersulphone, is sandwiched between two untreated porous carbon plates; this sandwich placed in a hot-press; the temperature of the hot-press elevated so as to heat the composite to a temperature in the range of approximately 500°–700° F.; and, the sandwich compressed under a pressure of approximately 200 to 500 psi. The temperature can be maintained for a suitable period of time, such as a ½ hour, and the length of the compression cycle can vary with the flow characteristics of the various sealant materials. Subsequent to the completion of the compression cycle, the resultant sandwich can be maintained under the compressive load within the press and cooled to ensure fusion of the lamina prior to release of pressure. The composite bipolar plate resulting from this process can thereafter be further machined to increase its gas distribution capacity, or, if the porosity of the plate is sufficient, used as is.

BRIEF DESCRIPTION OF THE DRAWINGS

The invention will now be described with regard to the following drawings and description in which like elements have been given common reference numbers.

DETAILED DESCRIPTION OF THE PREFERRED EMBODIMENTS

Figure 1:
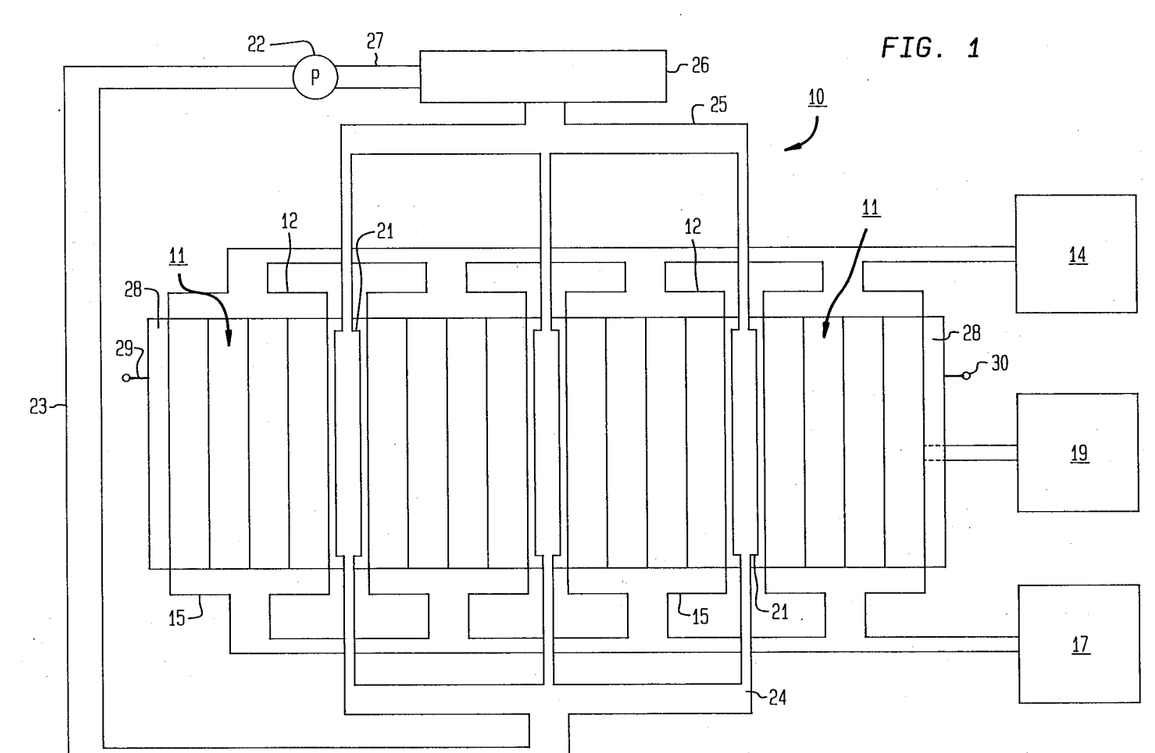
FIG. 1 is a schematic representation of a fuel cell assembly comprising a plurality of stacked fuel cells with intermediate cooling plates and terminal current collecting plates.

An exemplary fuel cell stack assembly 10 employing a plurality of fuel cells 11 in accordance with this invention is now described with reference to FIGS. 1 and 2. Hydrogen gas input manifolds 12 are arranged along one side of the stack assembly 10. While a plurality of manifolds 12 are shown for each group of fuel cells 11, if desired, a single manifold arrangement could be used. The manifolds 12 are connected to a source of hydrogen gas 14. Hydrogen gas collecting manifolds 15 are arranged along the opposing stack side in correspondence with the gas input manifolds 12. Here again, while a plurality of manifolds 15 are shown, a single manifold could be used if desired. The collecting manifolds 15 are, in turn, connected to a hydrogen gas discharging or recirculating system 17. The hydrogen gas from the input manifolds 12 flows through gas distribution plates 18 to the collecting manifolds 15.

In a similar fashion, a plurality of oxygen or air input manifolds (not shown) are arranged along the stack side (not shown) connecting the one stack side and the opposing stack side. These oxygen manifolds are connected to an oxygen source 19. The oxygen may be supplied in the form of air rather than pure oxygen if desired. In a similar fashion, a plurality of collecting manifolds are arranged along the stack side (not shown) opposing the stack side having the oxygen input manifolds and connecting the respective one stack side and opposing stack side. These manifolds would also be connected to an oxygen storage or recirculating system (not shown). The oxygen or air from the input manifolds (not shown) flows through the oxygen gas distribution plates 20 to the respective collecting manifolds (not shown).

In this embodiment, cooling plates 21 are arranged periodically between adjacent fuel cells 11. Three cooling plates 21 are shown arranged intermediate each four cell 11 array. The cooling fluid flowing through the cooling plates 21 can be any suitable material such as a dielectric high temperature oil manufactured by Monsanto under the trade name "Therminol." A pump 22 circulates the cooling fluid via conduit 23 and input manifold 24 into the respective cooling plates 21. The cooling fluid then flows into collecting manifold 25 which is connected to a heat exchanger 26 for reducing the temperature of the cooling fluid to the desired input temperature. A conduit 27 then connects the heat exchanger back to the pump 22 so that the fluid can be recirculated through the respective cooling plates 21.

The fuel cells 11 and the cooling plates 21 are electrically conductive so that when they are stacked as shown, the fuel cells 11 are connected in series. In order to connect the stack assembly 10 to a desired electrical load, current collecting plates 28 are employed at the respective ends of the stack assembly 10. Positive terminal 29 and negative terminal 30 are connected to the current collecting plates 28 as shown and may be connected to the desired electrical load by any conventional means.

Each fuel cell 11 is made up of a plurality of elements and includes a hydrogen gas distribution plate 18 and an oxygen or air distribution plate 20. Arranged intermediate the respective gas distribution plates 18 and 20 are the following elements starting from the hydrogen gas distribution plate 18; anode 31, anode catalyst 32, electrolyte 33, cathode catalyst 34 and cathode 35. These elements 31-35 of the fuel cell 11 may be formed of any suitable material in accordance with conventional practice.

The hydrogen gas distribution plate 18 is arranged in contact with the anode 31. Typically, the anode comprises a carbon material having pores which allow the hydrogen fuel gas to pass through the anode to the anode catalyst 32. The anode 31 is preferably treated with Teflon (polytetrafluoroethylene) to prevent the electrolyte 33, which is preferably an immobilized acid, from flooding back into the area of the anode. If flooding were allowed to occur, the electrolyte would plug up the pores in the anode 31 and lessen the flow of hydrogen fuel through the cell 11.

The anode catalyst 32 is preferably a platinum containing catalyst. The cell 11 is formed of an electrically conductive material, such as a carbon based material except for the immobilized acid electrolyte layer which does not conduct electrons but does conduct hydrogen ions. The various elements, 18, 31-35, and 20 are compressed together under a positive pressure. The electrolyte 33, such as phosphoric acid, is immobilized by being dispersed in a gel or paste matrix so that the acid is not a free liquid. An exemplary electrolyte matrix could comprise a mixture of phosphoric acid, silicon carbide particles and Teflon particles.

The cathode catalyst 34 and the cathode 35 are formed of the same types of materials as the respective anode catalyst 32 and anode 31. Therefore, the anode 31 and the cathode 35 comprise porous carbon and the anode catalyst 32 and cathode catalyst 34 can comprise a platinum containing catalyst. The cathode 35 can also be treated with Teflon to prevent the electrolyte from flooding back into the porous carbon comprising the cathode.

Figure 2:
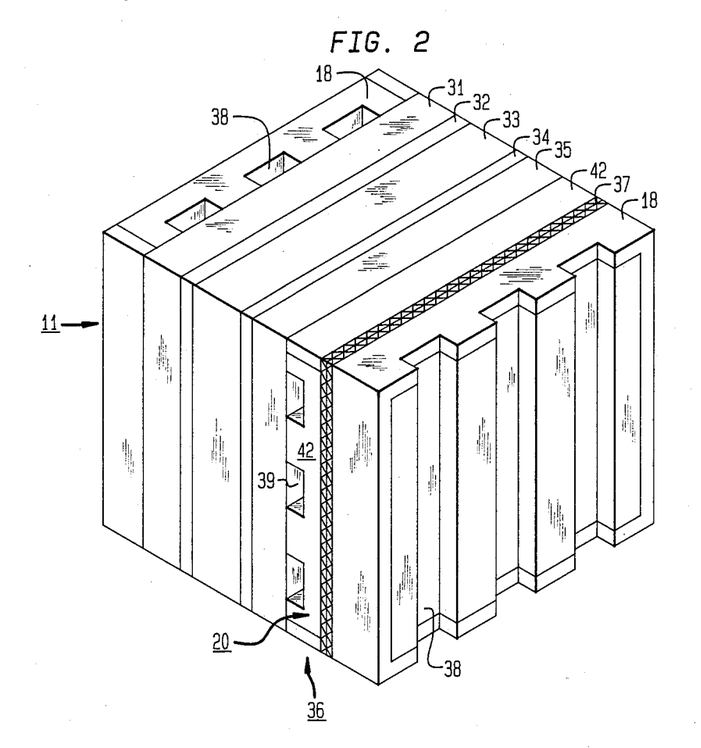
FIG. 2 is a perspective view of a portion of the fuel cell assembly of FIG. 1 illustrating an individual fuel cell having bipolar assemblies in greater detail.

All of the elements of the cell 11 are arranged in intimate contact as shown in FIG. 2. In order to provide an electrically interconnected stack assembly 10, bipolar assembly 36 is used to connect together adjacent fuel cells 11. A bipolar assembly 36 is comprised of a hydrogen gas distribution plate 18 and an oxygen or air distribution plate 20 bonded together at inner impervious interface region 37 shown cross-hatched. Therefore, a bipolar assembly 36 is comprised of the hydrogen gas distribution plate 18 of one cell 11 and the oxygen or air gas distribution plate 20 of the next adjacent cell 11. The interface region 37 will be described in more detail hereinafter in connection with the description of FIGS. 4 and 5.

In order to facilitate the gas flow in the gas distribution plates 18 and 20, respective channels or grooves 38 or 39 are employed. The grooves 38 in the hydrogen gas distribution plate 18 are arranged orthogonally to the grooves 39 in the oxygen or air gas distribution plate 20. This allows the grooves to be easily connected to respective input and output manifolds 12 and 15, for example, on opposing sides of the cell stack assembly 10. Although grooves within a particular plate, such as plates 18 or 20, are shown as extending in a unidirectional manner in FIG. 2, there also can be cross-channels made between these grooves to aid in the distribution of the fluidic reactant materials. When such cross-channels are utilized, the primary flow of reactants is still in the direction of the grooves 38 and 39 shown in FIG. 2; that is, in the direction that the reactants flow between the reactant's input and collecting manifolds.

The gas distribution plates 18 and 20 supply the respective hydrogen and oxygen or air gases to the surfaces of their respective anode 31 or cathode 35. In order to more evenly distribute the respective gases at the anode 31 or cathode 35 plate surfaces, the gas distribution plates 18 and 20 are formed of a porous material such as porous carbon. This allows the respective gases to flow through the pores of the plates 18 and 20 between the respective channels 38 or 39 to provide more uniform gas distribution over the face of the respective anode 31 or cathode 35.

Figure 3A:
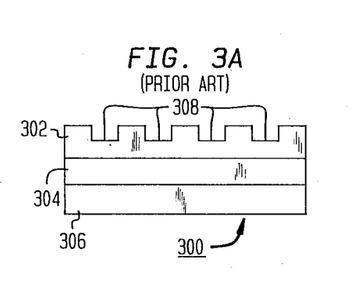
FIGS. 3a–3c describe prior art methods of forming bipolar plate assemblies used in the fuel cell stack systems.

Referring now to FIG. 3, prior art methods of forming bipolar assemblies are briefly described. In FIG. 3a, assembly 300 of three plates, called the A-B-A assembly, is shown comprising two grooved porous carbon plates 302 and 304 and an impervious plate 306 positioned between plates 302 and 304. The grooves in the carbon plates are gas distribution channels, each plate's channels (channels 308 in plate 302, the channels in plate 304 are not visible in this figure) being substantially perpendicular to each other. The two porous plates are generally sealed along their edges so that the reactants cannot escape and mix with each other. The impervious plate 306 prevents reactants from through-plane transmission; that is, passage from porous plate 304 to porous plate 302 through the plane of impervious plate 306. Electrical conductivity between the plates 302 and 304 must be preserved, however. The A-B-A assembly requires the addition of the plate 306, thereby causing extra steps in bonding the assembly together and increasing the size of the assembly by the thickness of the impervious plate 306.

Figure 3B:
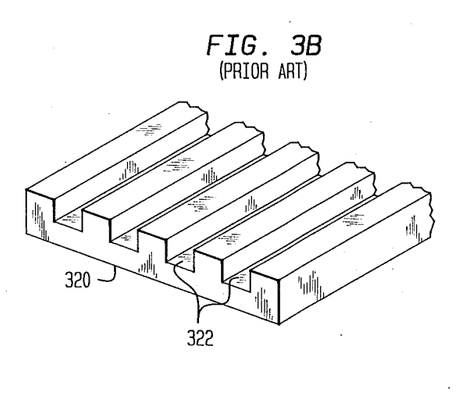

FIG. 3b shows another prior art approach to providing a bipolar assembly. A single channeled porous carbon gas distribution plate 320 is shown although in use it is assembled with another such plate to form a bipolar assembly. After the channels 322 are made, five or six layers of a suitable material such as a resin or carbonized material are placed on or impregnated into all surfaces. This technique substantially eliminates the surface porosity of the plate and significantly reduces the plate's ability to receive and store acid. Also, the sealing layer on the plate is quite thin and if damaged could reexpose the pores in sealing layer surface of the plate thereby providing a passage for unwanted through-plate transmission of reactant gases.

Figure 3C:
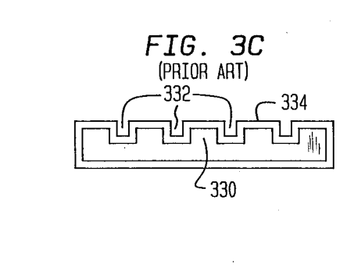

Finally, FIG. 3c shows a plating approach to bipolar assembly construction. A non-porous aluminum plate 330 is used for gas distribution which has grooves 332 for reactant gas channels. Since the aluminum plate is not porous, it is unlikely to permit the unintended escape of reactants. However, this type of plate does not provide surface porosity for better distribution of reactant gases to the electrodes. Also, the aluminum is subject to corrosion from the electrolyte used in the cell. To prevent this, a layer of non-corrosive material 334 has to be placed over the entire plate. Gold plating is used for this purpose and is obviously quite expensive.

Figure 4:
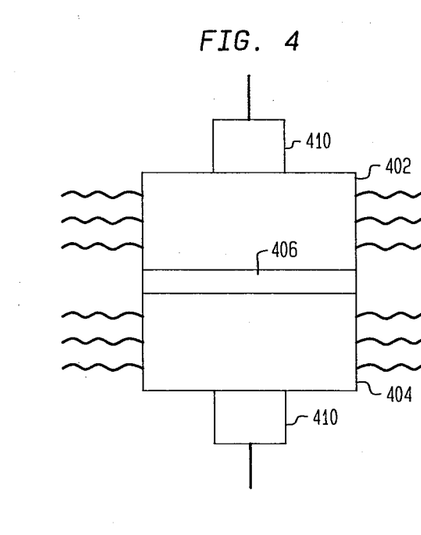
FIG. 4 is a elevational view of the process of forming a porous bipolar gas distribution plate assembly in accordance with the present invention.
Figure 5:
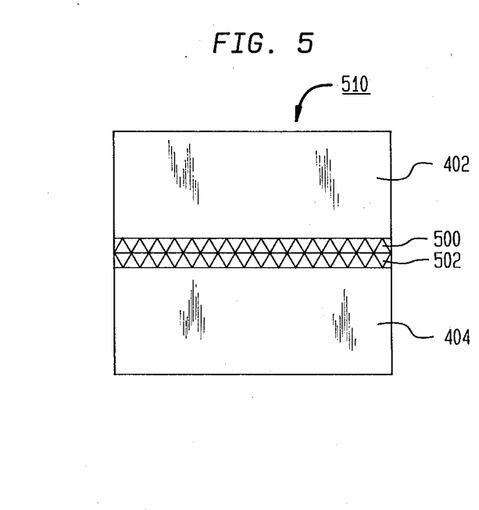
FIG. 5 is an elevational view of porous bipolar gas distribution plate assembly made in accordance with the process illustrated in FIG. 4.

Referring now to FIGS. 4 and 5, the hot press method for manufacturing the integral impervious region 37 of FIG. 2 is described in connection with FIG. 4. In FIG. 4, two porous gas distribution plates 402 and 404 are shown with a layer of thermoplastic sealant material 406 positioned between. The assembly of plates 402 and 404 and layer of sealant material 406 are pressed together under pressure in a press 410. The temperature of the assembly is elevated to a relatively high temperature while the pressure is being applied causing the layer of sealant material 406 to melt and diffuse into the pores of the plates 402 and 404. The sealant material forms an integral impervious region 500, as shown in FIG. 5, at the interface 502 of plates 402 and 404. Interface 502 is formed by pressing the plates 402 and 404 together into contact after the melting and diffusion of the layer 406.

When the proper amount of thickness of layer 406, pressure and elevated temperature are used, the layer completely impregnates the adjacent plate surfaces to form the impervious region 500 leaving substantially no sealant material between adjacent plate surfaces. Intimate contact at the interface 502 of the plates 402 and 404 thereby results to provide good electrical conductivity. The pressure from press 410 preferably continues to be applied while the plates 402 and 404 are allowed to cool to a lower temperature. This process results in the plates 402 and 404 being bonded and held in electrical contact by an impervious region 500 to form a single porous bipolar gas distribution plate assembly designated generally 510 in FIG. 5. The plates 402 and 404 have good surface porosity, no through-plane porosity for the transmission of reactants across interface 502, but good through-plane electrical conductivity between the plates.

The porous plates 402 and 404 are preferably porous carbon plates. For instance, the plates can be reticulated vitreous carbon (RVC) plates; needled-felt plates; or graphite plates. RVC plates have relatively large pores, approximately 0.1 to 1.0 millimeter size, while needled-felt plates have relatively small pores approximately 0.01 to 0.1 millimeter size. Graphite plates can be made of the same material as that commercially available for use as industrial graphite electrodes. They are molded or extruded elements made from graphite particles. Graphite plates have relatively very small pores, approximately 0.001 to 0.01 millimeter size. The graphite material is the preferred material for use as plates 402 and 404.

Porous plates are preferred because cross grooves can be eliminated, reactants can move around the clogs that may be formed in some of the pores, and any electrolyte in the area can be taken up. When designing the bipolar assembly, a balance must be made among all of the above features as an aid in selecting optimum pore size.

Any suitable material, including electrically insulating materials, can be used for the sealant material. For instance, suitable thermoplastic resin materials can be used. However, the operating temperature of the fuel cell, the nature of the corrosion-producing conditions in the cell, etc., may require the materials used to be selected more carefully. For instance, when a hot electrolyte such as phosphoric acid at temperatures of about 350°–450° F. is used in the cell, suitable candidate materials include FEP Teflon (fluorinated ethylene-propylene), polyparabanic acid, polyethersulphone, polysulphone, polyphenylsulphone and PFA Teflon (perflorinated alkoxy tetrafluoroethylene). The material provides impervious bond between the porous plates 402 and 404 after assimilation into the bipolar assembly and yet does not interfere with electrical conductivity. Suitable candidate materials for such use are FEP Teflon (flourointated ethylene-propylene), polyparabonic acid and polyethersulphone.

The pressure applied to the two carbon plates 402 and 404 by press 410 must be great enough to force the two opposite surfaces of the plates together into intimate contact but must not be so great as to crush the plate material. In using RVC for plates 402 and 404, the pressure was lowered to approximately 200 psi since RVC material is very brittle and may crack at higher pressures. This may lead to a reduction in electrical conductivity when RVC is used since the points of contact on the adjoining surfaces would be fewer. In using nettled-felt plate material, a pressure of about 1260 psi was used.

Once the assembly of plates and layer of sealant material are placed in the press 410, the temperature is elevated to within a range of between approximately 500° and 700° F., but preferably about 650° F. plus or minus 20°. Generally it takes three or four minutes for the assembly and the press to heat up to the elevated temperature and stabilize from the ambient room temperature during the melting of the layer 406.

After heating takes place for the alloted time, the assembly is cooled, generally to about 350° F. under pressure. Cooling can take place naturally by turning off the heater, or by forced cooling such as by utilizing fans or a water spray. Cooling is continued until the sealant is sufficiently solidified at which time the pressure on the assembly can be removed.

The dynamics of the hot-pressing cycle causes the sealant film to flow into the pores along the surface of each of the porous plates thereby effectively sealing the surface of each such plate along its common interfacial boundary with the other without significant loss or impairment of the porous plate storage and/or gas distribution capacity. Since the sealant film has been redistributed within the pores of each such contiguous plate, or lamina, the distance between each such plate has been reduced, thus, maintaining continuity of electrical contact therebetween. Subsequent to the completion of the hot-pressing cycle, the compression of the sandwich can be maintained until the sandwich is adequately cooled to a temperature which results in solidification of the sealant within the pores.

Any suitable thickness of sealant material can be used to form the plate. It has been found that thicknesses of about 0.005 to 0.020 inches have produced bipolar plates with good sealing ability. It has also been found that when the thinner sealant layers are used, it is preferable to assure that the surfaces of the plates are relatively flat. They can be made flat by sanding or some other suitable technique.

One example of a bipolar assembly produced by the process of the invention is as follows. A needled-felt carbon material approximately 0.100 to 0.125 inches thick, as supplied by Pfizer, Incorporated, was used for the gas distribution plates. A layer of polyethersulphone sealant material approximately 0.020 inches thick was placed between the plates. The carbon plate-sealant assembly was then held together at approximately 500 lbs. per square inch at between approximately 500° and 700° F. for approximately ½ hour. The assembly was then allowed to cool to approximately 300° F. under a pressure of approximately 500 lbs. per square inch. Using a 0.0200 inch thick layer of polyethersulphone, the resulting bipolar assembly was leak-tested with good results.

Another example of a bipolar assembly produced by the process herein is using an extruded Great Lakes carbon-type HLM plate having relatively fine pores for the gas distribution plates. A layer of polyethersulphone sealant material approximately 0.005 inches thick was placed between the plates. The sealant-plate assembly was then subjected to a pressure of about 900 lbs. per square inch and a temperature of about 700° F. for about one hour. With the pressure still applied, the assembly was then cooled to about 300° F. and then the pressure released. Another plate material used in this process was an Airco Spear 940G extruded graphite material. This latter material was found to be less expensive and exhibited better corrosion resistance as compared to the HLM plate.

To facilitate distribution of the reacting gases, grooves may be placed in each of the porous plates, the grooves typically being approximately 1/16 of an inch deep and approximately 1/16 of an inch wide. If the porous structure in the carbon plates is sufficiently open, the grooves are not necessary. However, grooves are preferred, as are additional cross grooves to help overcome clogs and obstructions occurring in the carbon plates which may cut off flow of the reactants.

The patents and publications described herein are intended to be incorporated by reference herein. The invention may be embodied in other forms or carried out in other ways without departing from the spirit or essential characteristics thereof. For instance, current collecting and cooling assemblies having porous plates for distributing reactants there through can also be manufactured as, and embody the structure, described here. If the other elements of the current collecting assemblies and cooling assemblies are made of impervious materials, such as aluminum, the further purpose of interfacial region 37 within the porous distribution plate can be to prevent corrosion of the aluminum plate by the electrolyte as well as bonding the aluminum and porous plates together.

It is understood that a great number of combinations of temperature, pressure, and sealant materials can be utilized to make a desirable assembly. The temperature used should be sufficient to enable the sealant to flow into the pores of the plate. The pressure applied should be of sufficient value to place the two plate members in contact as the sealant flows into the pores. However, the pressure should not be so great as to cause crushing or other types of damage to the plates.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A method of producing a bipolar assembly for use in a fuel cell stack wherein contiguous plates are provided to distribute oxidant and reactant gas respectively to adjacent cells of said stack comprising the steps of:
   providing at least two electrically conductive distribution plates having a foraminous structure suitable for transporting gas therethrough;
   disposing a layer of thermally sensitive, insulative sealant material between said plates;
   applying pressure and elevated temperature to said plates and layer of thermally sensitive sealant material sufficient to render said layer deformable and bond said plates together upon redistribution of said sealant within the pores of said plates;
   said layer of insulative sealant material being present in such amount to impregnate the pores of said plates and form a substantially gas-impermeable barrier at the interface between said plates, said plates being bonded so that they are in contact with one another in electroconductive registry;

whereby said bipolar assembly is suitable to a series type electrical arrangement within said fuel cell stack and effectively isolates reactant and oxidant gasses on opposite sides of the interface between said conductive distribution plates of said bipolar assembly during operation of said fuel cell stack.

2. A process as in claim 1 further including the steps of cooling the assembly and then removing the pressure applied thereto.

3. A process as in claim 1 wherein said elevated temperature is between approximately 500° and 700° F.

4. A process as in claim 1 wherein said temperature is approximately 630°–670° F.

5. A process as in claim 1 wherein the pressure applied to said plates is at least approximately 200 lbs. per square inch.

6. A process as in claim 1 wherein the pressure applied to said plates is approximately 900 lbs. per square inch.

7. A process as in claim 1 wherein said sealant material is selected from the group consisting of fluorinated ethylene-propylene, polysulphone, polyethersulphone, polyphenylsulphone, perfluorinated alkoxy tetrafluoroethylene and mixtures thereof.

8. A process as in claim 1 wherein said layer of sealant material is approximately 0.005 to 0.020 inches thick.

9. A process as in claim 1 further comprising the step of placing grooves on opposite sides of said bipolar assembly to distribute fuel cell reactant materials.

10. A method of producing a bipolar assembly for use in a fuel cell stack wherein contiguous plates are provided to distribute oxidant and reactant gas respectively to adjacent cells of said stack comprising the steps of: providing at least two electrically conductive distribution plates having a foraminous structure suitable for transporting gas therethrough;

each of said plates being provided with at least one channel substantially along an axis thereof to allow for the substantially unrestricted flow of gas along said axis;

disposing a film of thermally sensitive, insulative material between said plates;

simultaneously applying a pressure of at least 200 psi and a temperature in the range of from about 500–700 degrees Fahrenheit to effect essentially complete redistribution of the film into the interfacial pores of said plates about the interfacial plane defined between said plates;

said film of insulative material being configured and dimensioned to impregnate the interfacial pores and form a substantially gas—impermeable barrier at the interface between said plates;

cooling the plates and insulative material while maintaining the pressure thereon so as to ensure the lamina remain bonded together upon release of the pressure;

said plates being bonded so that they are in contact with one another in electroconductive registry whereby said bipolar assembly is suitable for series type electrical arrangement within said fuel cell stack and effectively isolates reactant and oxidant gasses on opposite sides of the interface between said conductive distribution plates of said bipolar assembly during operation of said fuel cell stack.

* * * * *

UNITED STATES PATENT AND TRADEMARK OFFICE
CERTIFICATE OF CORRECTION

PATENT NO. : 4,732,637

DATED : March 22, 1988

INVENTOR(S) : C. J. Dettling, P. L. Terry

It is certified that error appears in the above—identified patent and that said Letters Patent is hereby corrected as shown below:

In Column 1, line 12, after the heading "BACKGROUND", please add the following new paragraph: --The Government has rights in this invention pursuant to Contract Number DE-AC01-78ET15366 awarded by the U.S. Department of Energy.--

Signed and Sealed this

Twenty-eighth Day of February, 1989

Attest:

DONALD J. QUIGG

Attesting Officer

Commissioner of Patents and Trademarks